(12) United States Patent
McKay et al.

(10) Patent No.: US 8,788,736 B2
(45) Date of Patent: Jul. 22, 2014

(54) METHODS AND STRUCTURE FOR COMMUNICATING BETWEEN A SATA HOST AND A SATA TARGET DEVICE THROUGH A SAS DOMAIN

(75) Inventors: Luke E. McKay, Rose Hill, KS (US); Charles D. Henry, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 171 days.

(21) Appl. No.: 13/337,648

(22) Filed: Dec. 27, 2011

(65) Prior Publication Data

US 2013/0166811 A1    Jun. 27, 2013

(51) Int. Cl.
*G06F 13/36* (2006.01)

(52) U.S. Cl.
USPC .......................................................... 710/306

(58) Field of Classification Search
USPC .......................................................... 710/306
See application file for complete search history.

(56) References Cited

U.S. PATENT DOCUMENTS

| | | | |
|---|---|---|---|
| 7,010,711 B2 * | 3/2006 | Bashford et al. ............... | 713/323 |
| 7,496,700 B1 | 2/2009 | Chong et al. | |
| 7,536,508 B2 * | 5/2009 | Davies .......................... | 711/114 |
| 7,584,319 B1 | 9/2009 | Liao | |
| 7,643,410 B2 * | 1/2010 | Chang et al. .................. | 370/229 |
| 7,653,775 B2 * | 1/2010 | Pujol et al. .................... | 710/315 |
| 7,673,184 B2 * | 3/2010 | Vedanabhatla et al. ......... | 714/43 |
| 7,739,432 B1 * | 6/2010 | Shaw et al. ..................... | 710/74 |
| 7,761,642 B2 * | 7/2010 | Stenfort ........................ | 710/306 |
| 7,774,424 B1 * | 8/2010 | Bailey et al. .................. | 709/211 |
| 7,814,245 B2 * | 10/2010 | Schauer ......................... | 710/62 |
| 8,127,059 B1 * | 2/2012 | Carr et al. ....................... | 710/74 |
| 2007/0226757 A1 | 9/2007 | Bashford | |
| 2007/0237174 A1 | 10/2007 | Chang et al. | |
| 2010/0146166 A1 | 6/2010 | Gadsing et al. | |
| 2011/0107002 A1 | 5/2011 | Jones et al. | |

FOREIGN PATENT DOCUMENTS

KR    2009-0061031    6/2009

* cited by examiner

*Primary Examiner* — Paul R Myers
(74) *Attorney, Agent, or Firm* — Duft Bornsen & Fettig (57) ABSTRACT

Methods and structure for directly coupling SATA hosts (SATA initiators) with SATA target devices through a SAS fabric and an enhanced SAS expander supporting such direct couplings. The enhanced SAS expander comprises SATA/STP connection logic to open a SAS (STP) connection between a directly attached SATA host and a SATA target device in response to receipt of an FIS from the host or target while no connection is presently open. The opened connection is closed after expiration of a predetermined timeout period of inactivity between the connected host and target. Thus, simpler, less costly SATA hosts and SATA target devices may be utilized while gaining the advantage of SAS architecture flexibility in configuration and scalability. SATA hosts may be coupled through the SAS fabric with a larger number of SATA target devices and multiple SATA hosts may be coupled with the SAS fabric.

12 Claims, 5 Drawing Sheets

METHODS AND STRUCTURE FOR COMMUNICATING BETWEEN A SATA HOST AND A SATA TARGET DEVICE THROUGH A SAS DOMAIN

BACKGROUND

1. Field of the Invention

The invention relates generally to serial Advanced Technology Attachment (SATA) storage systems and more specifically relates to methods and structure for coupling a SATA host/initiator to a SATA target device through a Serial Attached SCSI (SAS) switched fabric domain.

2. Discussion of Related Art

Storage systems often use high speed serial communications to interconnect host systems and storage devices to achieve longer interconnect cabling and better reliability (better electrical noise immunity). SATA is a common communication protocol and medium for such interconnects—especially in lower cost, smaller storage systems with a limited number of hosts (SATA initiators) and storage devices (SATA target devices). In general, a SATA host is directly coupled with a single SATA target devices (e.g., a single SATA disk drive or a single SATA storage system). SATA port multipliers permit some extension of this architecture to allow a single SATA host to couple with a small number of SATA target devices (i.e., up to 16 devices). SATA port multiplexers further extend the architecture to enable multiple SATA hosts to couple with a single SATA target device. The SATA protocols do not inherently provide for such expansion of a SATA storage architecture and the port multipliers/multiplexors provide only limited extensions to the basic SATA architecture.

SAS communication media and protocols inherently allow much more flexibility in configuring a topology of hosts (SAS initiators) and storage devices (SAS target devices). SAS architectures provide for SAS expanders that enable dynamic switching (a switched fabric) to couple any of several SAS initiators with any of several SAS target devices. Thus, SAS provides improved flexibility and scalability for larger storage systems.

SAS also provides a specific protocol (SATA Tunneling Protocol—STP) to allow connection of SATA target devices to a SAS switched fabric. A SAS initiator supporting STP (also referred to herein as an STP initiator) may then connect with SATA target devices through the SAS fabric (i.e., through one or more SAS expanders). STP, in essence, allows the STP initiator to connect to an identified SATA target through the SAS fabric. An expander directly coupled with the STP initiator follows the SAS protocols using STP to establish the connection (i.e., the route) to an identified SATA target device. Having established the route through the SAS fabric, SATA information is then exchanged between the STP initiator and the addressed SATA target device using standard SATA protocol. This allows for use of less costly SATA storage devices in a SAS architecture storage system. However, STP initiators (e.g., storage controllers) can be more complex and costly than SATA initiators. But present SAS architectures do not allow for SATA initiators (SATA hosts) to couple directly with a SAS fabric-only STP initiators may be coupled with a SAS fabric to exchange information with SATA target devices.

Thus it is an ongoing challenge to provide for low cost, high performance storage systems that include the flexibility of configuration and the scalability of a fully SAS architecture.

SUMMARY

The present invention solves the above and other problems, thereby advancing the state of the useful arts, by providing methods and structure for directly coupling SATA hosts (SATA initiators) with a SAS fabric through an enhanced SAS expander supporting such direct couplings. The enhanced SAS expander comprises SATA/STP logic to directly couple with a SATA host and to thereby allow SATA protocol exchanges between a SATA host and a SATA target device through a SAS fabric. Thus, simpler, less costly SATA hosts and SATA target devices may be utilized while gaining the advantage of SAS architecture flexibility in configuration and scalability. Further, SATA hosts may be coupled through the SAS fabric with a larger number of SATA target devices and multiple SATA hosts may be coupled with the SAS fabric (by comparison with SATA standards including port multipliers and port multiplexors).

In one aspect hereof, an enhanced SAS expander is provided comprising a first physical link (PHY) for coupling the SAS expander with a SATA host. The SATA host exchanges information with the expander using SATA protocol. The expander further comprises an STP connection circuit operable to establish and manage an STP connection between the SATA host and a SATA target device.

Another aspect hereof provides a system comprising a SATA host, one or more SATA target devices, and a SAS switched fabric coupling the SATA host with the one or more SATA target devices. The SAS switched fabric comprising at least a first SAS expander having a first physical link (PHY) coupled to the SATA host. The first SAS expander comprises an STP connection circuit operable to establish and manage an STP connection between the SATA host and each of the one or more SATA target devices.

Still another aspect hereof provides method operable in an enhanced SAS expander. The expander is coupled with a SATA host through a first physical link (PHY) of the enhanced SAS expander. The enhanced SAS expander is coupled with a SATA target device through a physical link (PHY—and across PHYs of zero or more other expanders). The method comprises receiving a first Frame Information Structure (FIS) from the SATA host. The FIS directed to the SATA target device. The method further comprises opening a SAS connection to the SATA target device using SATA Tunneling Protocol (STP) in response to receipt of the first FIS and transmitting the first FIS to the SATA target device through the opened SAS connection.

DETAILED DESCRIPTION OF THE DRAWINGS

Figure 1:
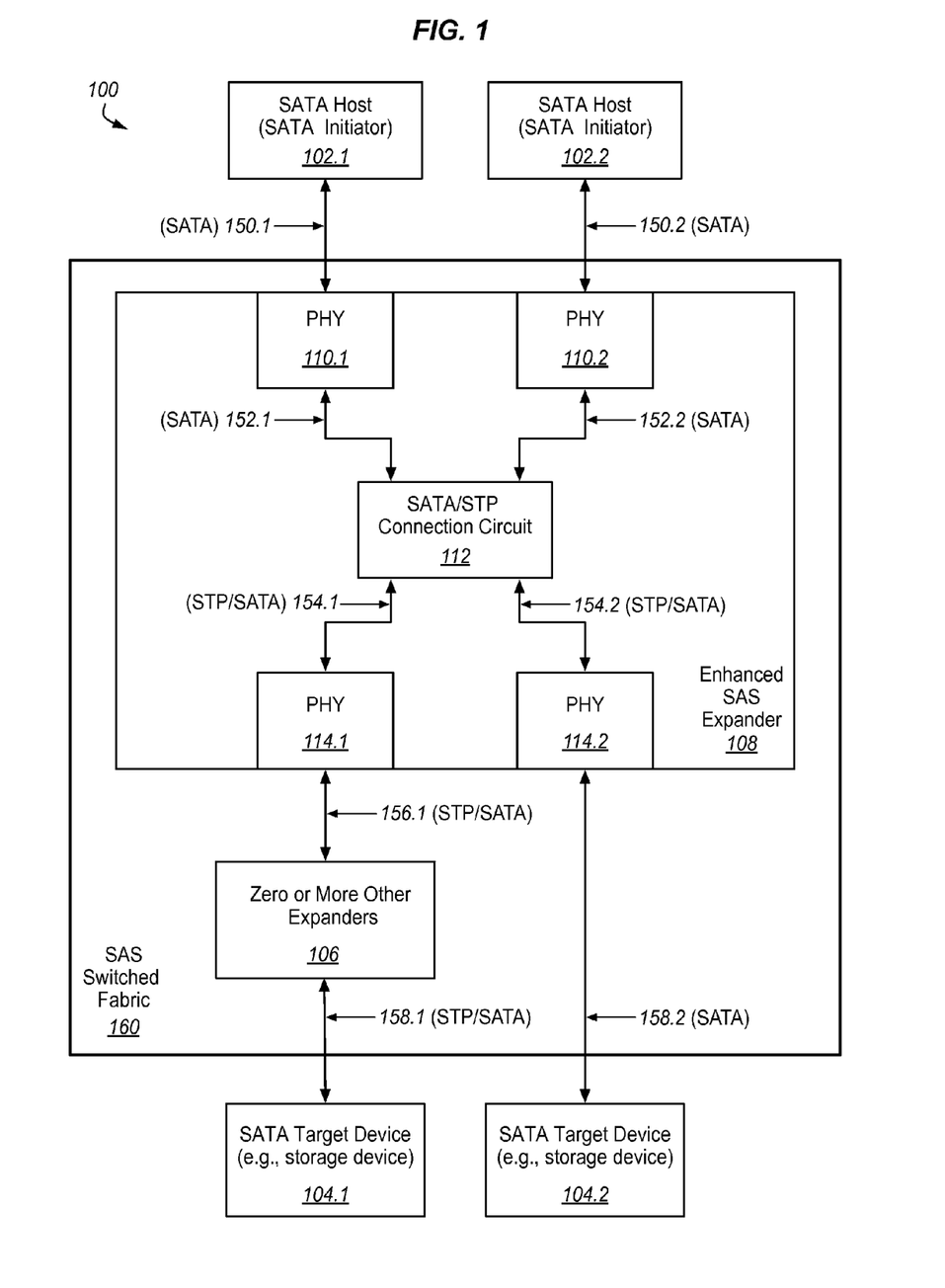
FIG. 1 is a block diagram of an exemplary storage system comprising an enhanced SAS expander for directly coupling with a SATA host in accordance with features and aspects hereof.

FIG. 1 is a block diagram of an exemplary system 100 including a SAS switched fabric comprising at least enhanced SAS expander 108. Expander 108 is coupled with one or more SATA hosts 102.1 and 102.2 (i.e., SATA initiators operating using the SATA protocols). Each SATA host 102.1 and 102.2 is directly coupled with expander 108 through a corresponding physical link (PHY) 110.1 and 110.2, respectively, through SATA communication paths 150.1 and 150.2, respectively. Expander 108 is coupled to one or more SATA target devices 104.1 and 104.2. The one or more SATA target devices (104.1 and 104.2) may be coupled with expander 108 via one or more PHYs 114.1 and 114.2 of expander 108 and communication paths 156.1 and 156.2, respectively. Fabric 160 may comprise zero or more other expanders 106. Some SAS Expander of the fabric (e.g., 108 or 106) is directly coupled with each SATA target device (104.1 and 104.2). For example, SATA target device 104.1 is coupled with other expander 106 of fabric 160 via SATA communication path 158.1 and target device 104.2 is directly coupled with enhanced expander 108 of fabric 160 via SATA communication path 158.2.

Those of ordinary skill in the art will readily recognize that any number of SATA target devices may be coupled with enhanced expander 108 and that fabric 160 may comprise any suitable number of SAS expanders (including at least enhanced expander 108). Further, any number of SATA hosts may be coupled directly with expander 108—each through a corresponding PHY of expander 108.

Expander 108 establishes a connection with SATA target devices 104.1 and 104.2 utilizing the SATA Tunneling Protocol (STP) and, after establishing such an STP connection, exchanges SATA information through SAS fabric 160 between a SAST host (102) and a SATA target device (104). Enhanced expander 108 and the other expanders 106 of fabric 160 establish a desired connection using STP protocol to establish the SAS/STP connection. Those of ordinary skill in the art will recognize that, where enhanced SAS expander 108 is directly coupled with a SATA target devices (e.g., 104.2), expander 108 may similarly utilize its internal STP protocol logic to establish the desired open connection or may bypass some SAS layers of logic and determine that the connection may be established by customized logic within the enhanced expander.

In accordance with features and aspects hereof, SATA hosts 102.1 and 102.2 are directly coupled with enhanced SAS expander 108. SATA/STP connection circuit 112 is operable to establish a connection for SATA. With such a connection established, standard SATA protocols are used to exchange information between a SATA host 102 and the SATA target devices 104 through the SAS switched fabric 160. SATA protocol, unlike SAS protocols, does not define protocol exchanges to specifically open and close a logical connection between a SATA host and a SATA target through a SAS fabric 160. Thus, in operation, connection circuit 112 opens a SAS (STP) connection through fabric 160 between expander 108 and any of one or more SATA target devices 104.1 in 104.2 in response to receipt of a first frame information structure (FIS) from a directly coupled SATA host 102.1 or 102.2. Once the SAS (STP) connection has been opened by operation of connection circuit 112, the received first FIS will be forwarded to the identified SATA target device (identified by fields of the first received FIS). Subsequent SATA FISs or SATA primitives received from directly coupled SATA hosts 102.1 or 102.2 are also transmitted/forwarded by circuit 112 through fabric 160 to the identified SATA target device using standard SATA protocols.

Since SATA protocols do not provide for explicit closing of a connection, connection circuit 112 may maintain a timer measuring an idle period of time during which no further information is exchanged between a SATA host and a SATA target device through a previously opened SAS connection. Upon expiration of a predetermined timeout of the timer, connection circuit 112 may force the SAS (STP) connection to close thus freeing resources of expander 108 (and fabric 160) for other connections to be opened.

In processing some exchanges, the SATA host may initiate a request (such as a read request) to an identified SATA target device and then await receipt of requested data from the identified SATA target device. In such a case, after expiration of the predetermined timeout period, connection circuit 112 closes the previously opened SAS (STP) connection. When the SATA target device providing the requested data is ready to return such data, connection circuit 112 will receive the SATA information from the target device and will reopen the previously closed SAS (STP) connection with the requesting SATA host directly coupled with the enhanced expander 108. To reopen a SAS (STP) connection, the enhanced expander 108 returns the requisite SAS OPEN_ACCEPT primitive to the SAS fabric 160 (since the SATA host 102 does not provide such SAS protocol logic). Once the closed SAS connection has been reopened, the data returned from the SATA target device will then be forwarded through fabric 160 to the SATA host as one or more corresponding FISs.

Further details of the operation of enhanced SAS expander 108 are discussed herein below with reference to other figures. Those of ordinary skill in the art will recognize that the enhanced features of expander 108 may be implemented as a separate device coupled between each SATA host 102 and the SAS fabric 160. Such a separate device may be designed, for example, as a "daughter board" coupled with each SATA host 102 to provide the enhanced features. Such a separate device may, in fact, be implemented as a specialized SAS expander having only 2 ports—a first port/PHY for direct coupling with a SAST host and a second port/PHY for coupling with the remainder of the SAS fabric. Further, those of ordinary skill in the art will recognize that SATA/STP connection circuit 112 may be implemented as logic circuits integrated with other functional circuits of an enhanced SAS expander or may be implemented as a separate circuit with the expander. These and other design choices will be readily apparent to those of ordinary skill in the art. Numerous additional and equivalent elements may be present in a fully functional expander such as enhanced SAS expander 108. Such additional and equivalent elements are well known to those of ordinary skill in the art and omitted herein for simplicity and brevity of this discussion.

Figure 2:
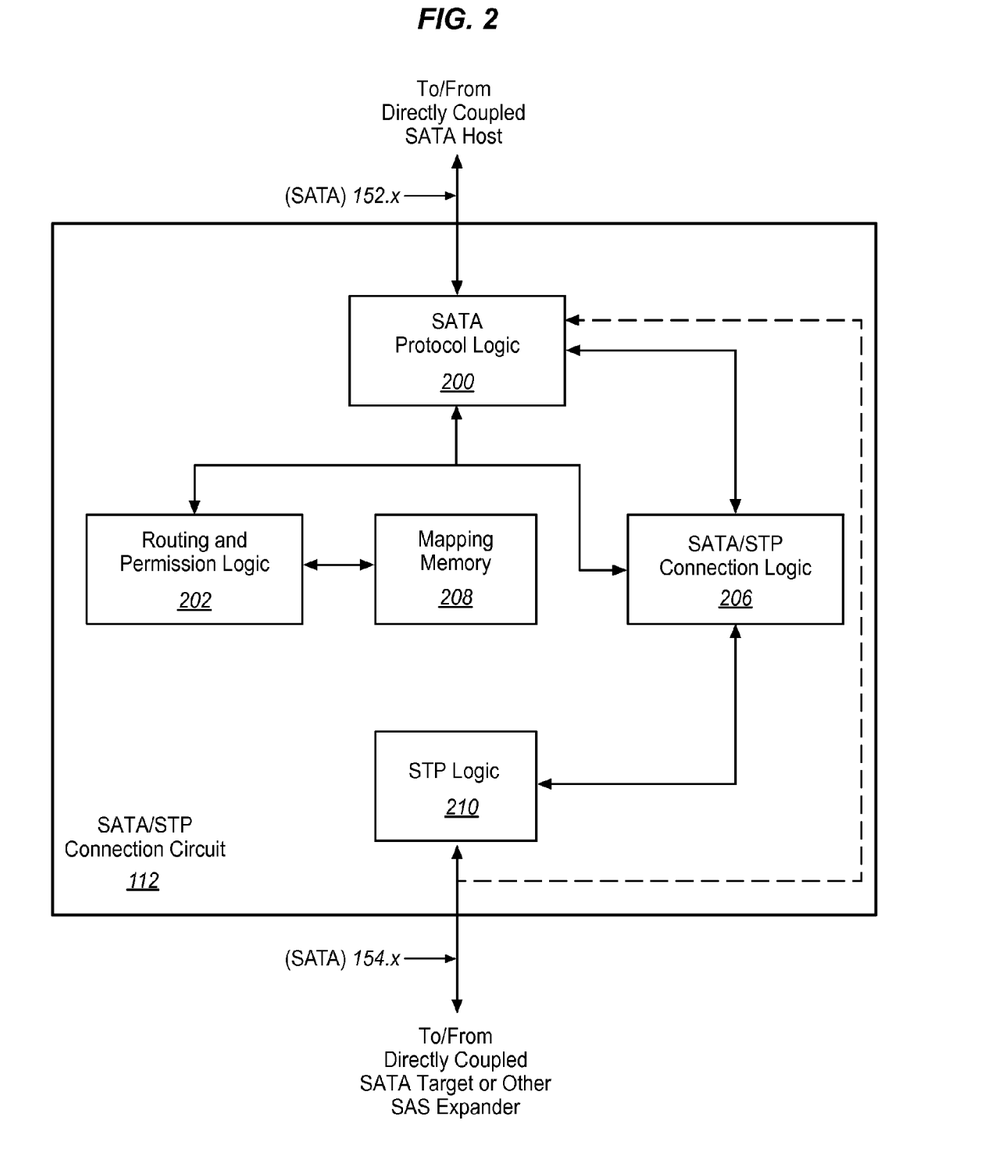
FIG. 2 is a block diagram providing exemplary additional details of a SATA/STP connection circuit of the enhanced SAS expander of claim 1 in accordance with features and aspects hereof.

FIG. 2 is a block diagram providing exemplary additional details of the structure of connection circuit 112 in accordance with one exemplary embodiment. Circuit 112 may comprise logic circuits either tightly or loosely integrated with logic circuits of the enhanced expander for implementing link layer connectivity (and/or other higher layer protocols of the SAS and SATA protocols). Connection circuit 112 may comprise SATA protocol logic 200 representing any suitable logic/circuits for interfacing directly with a SATA host device through an appropriate PHY of the SAS expander (i.e., PHY 110 of expander 108 of FIG. 1). In some exemplary embodiments, logic 200 may be integrated with the logic of the corresponding PHY. In general, logic 200 may perform any processing to interact with an attached SATA initiator using the SATA protocol over path 152. STP logic 210 represents any suitable logic/circuits for establishing connectivity with either a directly attached SATA target device or with one or more other SAS expanders of the SAS switched fabric. In some exemplary embodiments, logic 210 may be integrated with the logic of the corresponding PHY. In general, logic 210 is operable to establish an open connection using the SAS/STP protocol (either with a directly coupled via path 154 with a SATA target device or via path 154 with a SATA target device coupled through one or more other SAS expanders of the SAS fabric). SATA/STP connection logic 206 represents any suitable logic/circuits for opening and closing a SAS (STP) connection, in cooperation with logic 210, on behalf of a SATA host directly coupled with the enhanced expander. Once a SAS (STP) connection is established, SATA Information received from a SATA host through SATA protocol logic 200 is forwarded to the identified SATA target device through the SAS switched fabric coupled thereto (as indicated by the dashed arrow). Information received from a SATA target device through the SAS switched fabric is, in like manner, forwarded SATA host through logic 200 using SATA protocols (as also indicated by the dashed arrow). When the previously opened connection is closed (i.e., by an idle period timeout), SATA information is no longer transferred but rather may cause re-opening of the closed connection.

Responsive to receipt of a first SATA FIS from a SATA host through logic 200, routing information logic 202 accesses information in mapping memory 208 to determine an appropriate route through the SAS fabric to reach an identified SATA target destination. Logic 202 may also determine whether permission information located in mapping memory 208 indicates that the requesting SATA host has permission to access the identified SATA target device. If logic 202 determines that access is denied, an appropriate rejection of the FIS is returned to the requesting SATA host through logic 200. If logic 202 determines that requested access is permitted, routing information in mapping memory 208 identifies an appropriate SAS route for directing information from the SATA host, through SAS fabric (including at least the enhanced expander), to the identified SATA target device using STP. The routing information may be utilized by connection logic 206 in opening the appropriate connection to allow exchange of SATA information between the SATA host and SATA target device.

Those of ordinary skill in the art will readily recognize numerous additional and equivalent elements that may be present in a fully operational connection circuit 112. Such additional and equivalent elements are omitted herein for simplicity and brevity of this discussion. Further, while circuit 112 is depicted and described as logic circuits, some or all of the functions of circuit 112 may be equivalently implemented as suitably programmed instructions executed by a general or special purpose computer of enhanced SAS expander 108.

Figure 3:
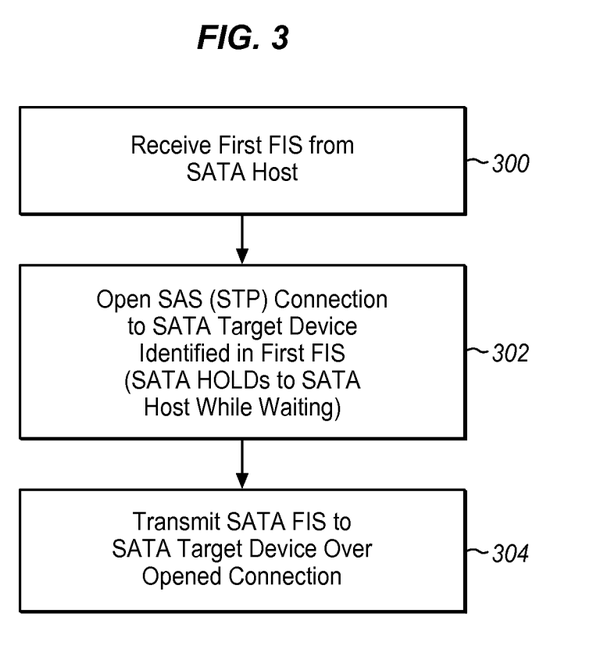
FIGS. 3 through 5 are flowcharts describing exemplary methods for directly coupling a SATA host to a SAS fabric through an enhanced SAS expander in accordance with features and aspects hereof.

FIG. 3 is a flowchart describing an exemplary method operable within an enhanced SAS expander in accordance with features and aspects hereof The method of FIG. 3 may be operable, for example, in the enhanced SAS expander described above with respect to FIGS. 1 and 2. Those of ordinary skill in the art will recognize that the method steps of FIG. 3 may be performed by any suitable logic circuits within the enhanced SAS expander. Thus, describing below the steps of FIG. 3 as operable on or within particular logic components of FIG. 1 or 2 is intended to merely teach one possible, exemplary embodiment. The steps of FIG. 3 may be performed by other logic circuits and/or programmed instructions of the enhanced SAS expander where other design choices decompose the various functions in another manner.

At step 300, the enhanced expander receives a first FIS from a directly attached SATA host. For example, SATA/STP connection circuit 112 of FIGS. 1 and 2, or more specifically SATA protocol logic 200 of circuit 112, may receive an FIS from the directly attached SATA host. Recognizing that the FIS is a first received FIS for a presently nonexistent connection, step 302 next opens a SAS (STP) connection to the identified SATA target device. For example, circuit 112 of FIGS. 1 and 2, or more specifically, logic/memory circuits 200 through 210 of FIG. 2 cooperate to determine an appropriate route for the desired connection through the enhanced expander and to request opening of the route so determined by sending an appropriate Open Address Frame (OAF). The connection may be established entirely within the enhanced SAS expander in configurations where both the SATA host and SATA target devices are directly coupled thereto or may be established through any number of intervening other SAS expanders that also comprise the SAS fabric. Where both the SATA host and the SATA target device are coupled directly with the enhanced SAS expander, the generation and transmission of an OAF may be bypassed in favor of internal logic to perform the same function without attempting to direct a SAS OAF through any transmission medium. While awaiting successful completion of the desired SAS open connection, the enhanced SAS expander may return SATA HOLD primitives to the SATA host to delay further transmissions from the SATA host until the connection is established. For example, logic 206 may generate and transmit SATA HOLD primitives back to the SATA host via logic 200 and path 152 while logic 206 and logic 210 cooperate to await the acceptance of the requested open connection (e.g., return of an OPEN_ACCEPT from the SAS domain or the equivalent acceptance from internal logic of the enhanced expander where both the SATA host and target are directly coupled with the expander). The SAS target device with which an open connection is to be established may identified by information within the FIS that is used to determine appropriate SAS routing/addressing information to permit opening of the SAS connection. Step 304 then transmits the SATA first FIS to the SATA target device (e.g., through the other SAS expanders, if any, of the SAS fabric) over the opened SAS (STP) connection. For example, once logic 206 determines that the requested open connection (STP connection) has been established, logic 200 may forward the first FIS received from the SATA host to the identified SATA target device using standard SAS transmissions as indicated by the dashed line (i.e., using the "tunnel" STP connection established through the SAS fabric (or otherwise established within the enhanced SAS expander).

Figure 4:
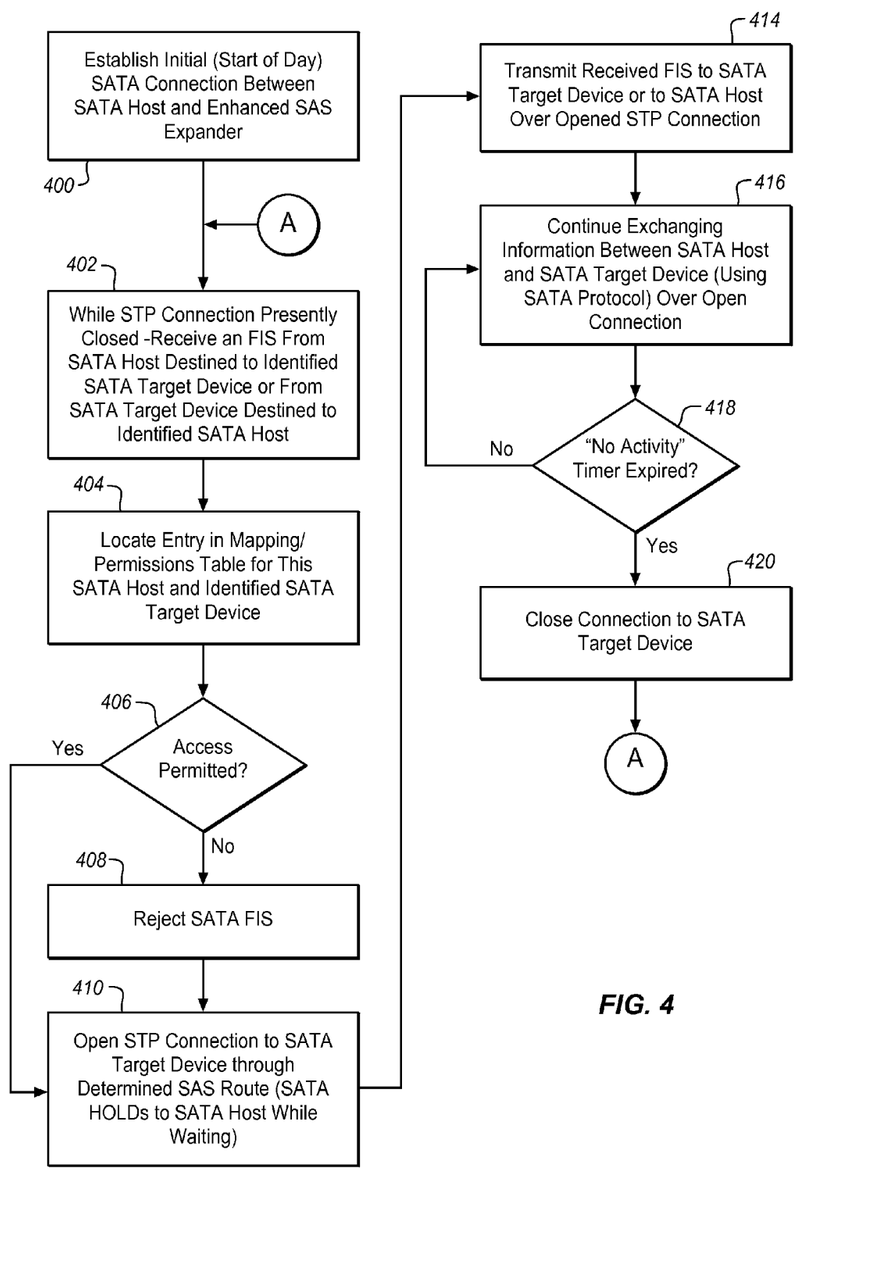

FIG. 4 is a flowchart describing another exemplary method for direct communications between a SATA host and an enhanced SAS expander in accordance with features and aspects hereof The method of FIG. 4 may be operable, for example, in an enhanced SAS expander such as that described in FIGS. 1 and 2. Those of ordinary skill in the art will recognize that the method steps of FIG. 4 (like those of FIG. 3) may be performed by any suitable logic circuits within the enhanced SAS expander. Thus, describing below the steps of FIG. 4 as operable on or within particular logic components of FIG. 1 or 2 is intended to merely teach one possible, exemplary embodiment. The steps of FIG. 4 may be performed by other logic circuits and/or programmed instructions of the enhanced SAS expander where other design choices decompose the various functions in another manner.

The method of FIG. 4 is similar to the method described in FIG. 3 but provides additional exemplary details for a specific exemplary embodiment of the method. At step 400, the enhanced SAS expander initially establishes a SATA connection directly between the SATA host and the corresponding PHY of the enhanced SAS expander. For example, logic 206 and 200 of FIG. 2 may cooperate to determine an appropriate speed for communications etc. Establishment of such a SATA connection may comprise well-known features of both SAS and SATA protocols to initially discover the existence of a SATA host (e.g., through a SAS "discovery" process) and to directly couple with a PHY of the SAS expander using standard SATA communication techniques to negotiate an appropriate, mutually supported speed for communications therebetween. In particular, as part of SATA Tunneling Protocol processing, the enhanced SAS expander receives an "Initial FIS" from each SATA target device coupled to the SAS fabric. A directly coupled SATA host must receive some Initial FIS from the enhanced SAS expander. Thus, the enhanced SAS expander (e.g., logic 206 and logic 210 of FIG. 2 in conjunction with other standard logic within the enhanced SAS expander) may generate an Initial FIS (e.g., indicating the presence of a SATA Port Multiplier) and transmit the generated Initial FIS to the directly coupled SATA host. In another exemplary embodiment, the enhanced SAS expander may simply forward one of the Initial FISs received from one of the SATA target devices to the SATA host. Processing of step 400 may be performed as an aspect of "start of day" initialization of the enhanced SAS expander (or of the underlying systems) or at various occasions to reset the expander or to reconfigure the entire SAS domain.

At step 402, the enhanced SAS expander receives an FIS from a directly attached SATA host destined to an identified SATA target device or from a SATA target device to be returned to a SATA host previously connected to the target. For example, logic 200 of FIG. 2 may receive such a first FIS from an attached SATA host via path 152. This FIS is received while there is no present connection open through the SAS fabric between the SATA host and target devices. When the FIS received from the SATA host, the FIS includes addressing information in accordance with SATA protocols identifying a particular SATA target device to which the FIS is directed. When received from a SATA target device (e.g., read data to be returned to a SATA host previously connected with the target), stored information within the enhanced expander may indicate the SATA host that had previously requested the target to return information. Step 404 (e.g., logic 202 and using memory 208 of FIG. 2) locates a corresponding entry in a mapping/permissions table stored in a memory of the enhanced SAS expander. The located entry is associated with the directly attached SATA host and the SATA target device. Where the FIS is received from the SATA host, the located entry includes permission information indicating whether the directly attached SATA host is permitted access to the identified SATA target device. The located entry also includes routing information to identify a particular SAS address and associated route for transmission of the SATA information to the identified SATA target device (as corresponding STP information through the SAS fabric using STP). Where the received FIS is returned data from a SATA target device, the located entry may be an entry that identifies the SATA target device and the SATA host that were previously connected such that the SATA host requested return of information from the target device.

If the FIS is from the SATA host, step 406 determines whether the located entry indicates that access is permitted by this SATA host to the identified SATA target device (e.g., as determined by logic 202 of FIG. 2 using information in memory 208). If the FIS is received from a SATA target device, permission may be presumed because the SATA host previously requested and was granted permission to access the target device (i.e., as implied by receipt of an initial/first FIS from the SATA host commencing communications with the target device). If permission is not allowed, step 408 rejects the received SATA FIS by returning an appropriate status indicator to the requesting SATA host (e.g., by operation of logic 200, 202, and 206 of FIG. 2).

If access by the SATA host to the identified SATA target device is permitted, step 410 opens (or re-opens) a SAS (STP) connection between the SATA host and the identified SATA target device through the SAS route as determined by the located mapping table entry. For example, logic 206 and 210 may cooperate to open (or re-open) the STP connection to the identified SATA target device. The open connection is established utilizing standard SAS (STP) protocols (e.g., an Open Address Frame—OAF) directed through the one or more SAS expanders of the SAS fabric. As noted above, as a matter of design choice, where the enhanced expander is directly coupled with both the SATA host and the SATA target, opening of the SAS connection could be performed by custom logic (e.g., logic 206 of FIG. 2) within the expander rather than in full compliance with generating and processing a SAS (STP) open connection exchange. While awaiting successful completion of the desired SAS open connection initiated by receipt of a first FIS from the SATA host, the enhanced SAS expander (e.g., logic 206 of FIG. 2 through logic 200) may return SATA HOLD primitives to the SATA host to delay further transmissions from the SATA host until the connection is established. At step 414, the received FIS is forwarded through the SAS fabric to the SATA target device (or SATA host if received from the target device). For example, logic 200, on behalf of the SATA host, may communicate directly with the identified SATA target via paths 154 as indicated by the dashed line arrow.

Steps 416 and 418 are then operable (substantially in parallel, e.g., by logic 200 and 206 of FIG. 2) to continue exchanging information between the SATA host and the SATA target device over the opened SAS (STP) connection through the SAS switched fabric. Step 418 determines whether a predetermined timeout threshold has been exceeded during which no activity occurred exchanging information between the SATA host the identified SATA target device through the opened SAS (STP) connection. Since the SATA protocol provides no mechanism for explicitly opening and/or explicitly closing a connection, a predetermined timeout period may be utilized to force closure of the open connection when idle thereby freeing resources within the enhanced SAS expander (and more generally resources of the SAS fabric) to permit other connections. When step 418 determines that the predetermined threshold period has expired, step 420 closes the previously opened connection between the SATA host in the SATA target device through the enhanced SAS expander and SAS fabric. The method may be repeated again starting at step 402 (label "A") when another FIS is received from the SATA host addressed to an identified SATA target device (the same or another target device) or when a SATA target device is ready to return requested information to a requesting SATA host.

Figure 5:
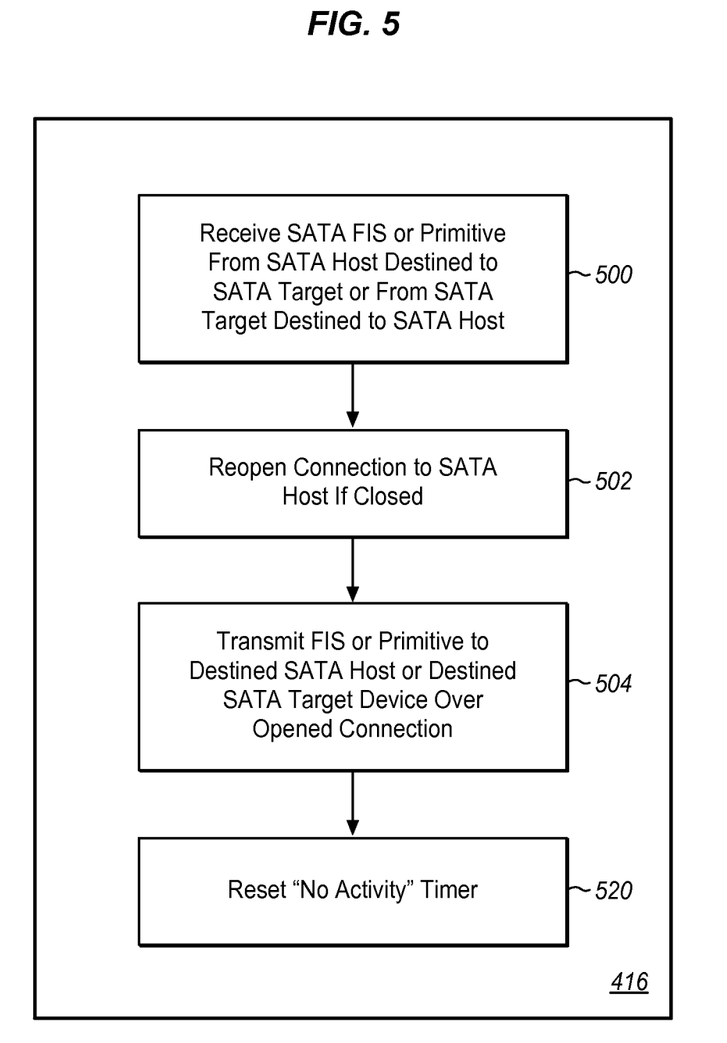

FIG. 5 is a flowchart describing exemplary additional details of the processing of step 416 of FIG. 4 to continue the exchange of information over the open connection. At step 500, a SATA FIS or primitive is received from the host bound for the target or from the SATA target bound for the host. At step 502, the connection is re-opened if it has been previously closed (e.g., due to a timeout or other condition). Step 504 then forwards the received information to its intended destination over the still open connection (or now re-opened connection). Step 520 then resets the "no activity" timer (discussed above) used to automatically close the open/re-opened connection due to inactivity between the SATA devices. The processing of step 416 essentially continues until (as discussed above in FIG. 4) a timeout occurs to force closing of the connection.

Those of ordinary skill in the art will readily recognize numerous additional and equivalent steps within fully functional methods such as the methods of FIGS. 3 through 5. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. An enhanced Serial Attached SCSI (SAS) expander comprising:
   a first physical link (PHY) for coupling the SAS expander with a Serial Advanced Technology Attachment (SATA) host, wherein the SATA host exchanges information with the expander using SATA protocol, wherein the PHY receives a first Frame Information Structure (FIS) from the SATA host, the FIS being directed to a SATA target device; and
   a SATA Tunneling Protocol (STP) connection circuit operable to open and close an STP connection between the SATA host and the SATA target device through the expander in response to receipt of the first FIS, wherein SATA protocol logic of the STP connection circuit holds transfer of the FIS via SATA HOLD primitives until the STP connection circuit establishes STP acceptance with the SATA target device.

2. The expander of claim 1
   wherein the connection circuit is further operable to transmit one or more SATA HOLD primitives to the SATA host while awaiting completion of the opening of the STP connection, and
   wherein the connection circuit is further operable to transmit the first FIS to the SATA target device in response to completion of the opening of the STP connection.

3. The expander of claim 1
   wherein the connection circuit is further operable to close an open STP connection between the SATA host and the SATA target device in response to expiration of a predetermined timeout during which no information is exchanged between the SATA host and the SATA target device.

4. The expander of claim 3
   wherein the connection circuit is further operable to re-open a previously closed STP connection between the SATA host and the SATA target device in response to receipt of information from the SATA target device to be returned to the SATA host.

5. The expander of claim 1 further comprising:
   a memory for storing a mapping table having one or more entries, each entry comprising a SAS identifier for a corresponding SATA target device,
   wherein the connection circuit is further operable, responsive to receipt of the first FIS, to access an entry of the mapping table to determine a SAS identifier for the SATA target device identified as the destination in the first FIS.

6. The expander of claim 5
   wherein each entry of the mapping table comprises permission information indicating whether the SATA host is permitted access to the SATA target device identified in the first FIS.

7. A method operable in an enhanced Serial Attached SCSI (SAS) expander, the expander coupled with a Serial Advanced Technology Attachment (SATA) host through a first physical link (PHY) of the enhanced SAS expander, the enhanced SAS expander coupled with a SATA target device, the method comprising:
   receiving a first Frame Information Structure (FIS) from the SATA host via the first PHY, the FIS directed to the SATA target device;
   holding transfer of the FIS via SATA protocol logic of a SATA Tunneling Protocol (STP) connection circuit of the expander until the STP connection circuit establishes STP acceptance with the SATA target device, wherein the SATA protocol logic holds transfer of the FIS by transferring SATA HOLD primitives to the host;
   opening a SAS connection to the SATA target device using STP via the STP connection circuit in response to receipt of the first FIS; and
   transmitting the first FIS through the opened SAS connection.

8. The method of claim 7 further comprising:
   receiving further SATA information from the SATA host; and
   transmitting the further SATA information to the SATA target device through the opened SAS connection.

9. The method of claim 7 further comprising:
   receiving further SAS information from the SATA target device through the opened SAS connection; and
   transmitting the further SATA information to the SATA host through the opened SAS connection.

10. The method of claim 7 further comprising:
    locating an entry in a table stored in a memory of the enhanced SAS expander, the entry corresponding to the SATA host and corresponding to the SATA target device; and
    determining from the located entry routing information to access the SATA target device through the one or more other SAS expanders using STP.

11. The method of claim 10 further comprising:
    determining from the located entry permission information indicative of permission for the SATA host to access the SATA target device; and
    rejecting the first SATA FIS in response to determining that the SATA host is denied access to the SATA target device.

12. The method of claim 7 further comprising:
    closing the open connection between the SATA host and the SATA target device in response to expiration of a predetermined timeout during which no information is exchanged between the SATA host and the SATA target device.

* * * * *